United States Patent [19]

Grosvenor et al.

[11] 4,004,935

[45] Jan. 25, 1977

[54] GLAZING COMPOSITIONS FOR CERAMIC ARTICLES

[75] Inventors: Derek Grosvenor, Middlesbrough; John Robert Frederick Nicholson, Stockton, both of England

[73] Assignee: Tioxide Group Limited, Billingham, England

[22] Filed: Nov. 14, 1974

[21] Appl. No.: 523,682

[30] Foreign Application Priority Data

Dec. 1, 1973 United Kingdom ............. 55803/73

[52] U.S. Cl. .................................. 106/48; 106/52; 106/54; 428/428
[51] Int. Cl.[2] .......................................... C03C 5/02
[58] Field of Search ................... 106/48, 49, 52, 46, 106/45, 54

[56] References Cited

UNITED STATES PATENTS

| | | | |
|---|---|---|---|
| 3,383,225 | 5/1968 | Stradley ............................... | 106/48 |
| 3,507,687 | 4/1970 | Laird .................................. | 106/48 X |
| 3,561,984 | 2/1971 | Eppler ................................ | 106/48 |
| 3,565,644 | 2/1971 | Eppler ................................ | 106/48 |

FOREIGN PATENTS OR APPLICATIONS

| | | | |
|---|---|---|---|
| 555,777 | 4/1958 | Canada ............................... | 106/48 |
| 951,089 | 3/1964 | United Kingdom ................. | 106/49 |

OTHER PUBLICATIONS

Parmelee, C. W.—Ceramic Glazes—Pub. by Industrial Publications, Inc., Chicago (1951) 2nd Ed., pp. 21–22, 191–194 and 216.

Primary Examiner—Helen M. McCarthy
Attorney, Agent, or Firm—Schuyler, Birch, Swindler, McKie & Beckett

[57] ABSTRACT

A glazed ceramic article in which the glaze includes titanium dioxide at least some of which is in the form of a metal titanate or a metal titano silicate and having a gloss of from 9 to 55 units at 45° illumination. Also a glazing composition is described prepared by a semi-fritting technique in which the composition includes a mixture of a finely divided frit and an unfritted crystalline silica with the titanium dioxide being included in the frit together with alumina and a source of strontium, calcium or magnesium.

21 Claims, No Drawings

GLAZING COMPOSITIONS FOR CERAMIC ARTICLES

This invention relates to articles and particularly to glazed ceramic articles having a glaze which has a satin or semi-gloss finish.

According to the present invention a ceramic article has a glazed surface in which the glaze comprises titanium dioxide at least some of which is in the form of a metal titanate or a metal titano silicate and in which the glaze has a gloss of from 9 to 55 units at 45° as hereinafter defined.

According to the present invention also a glazing composition comprises a mixture of a finely divided frit and an unfritted crystalline silica, together with water in which said frit comprises silica, titanium dioxide, one or more alkali metal oxides, alumina, and a source of strontium, calcium or magnesium.

According to the invention also a method for the production of a glazing composition comprises mixing together titanium dioxide, silica, alumina, a source of an alkali metal and a source of strontium, calcium or magnesium, heating the mixture so obtained until a homogeneous glass is formed, cooling the heated mixture rapidly to form a frit, grinding the frit and adding to the frit water and a further amount of silica to provide a glazing composition having the desired consistency.

The present invention provides a glazed ceramic article in which the glaze contains titanium dioxide in the form of a titanate or titano silicate. Generally the titanate or the titano silicate is present in a titanate or a titano silicate of strontium, calcium or magnesium. It is believed that this is formed during the heat treatment of the ceramic article at an elevated temperature to mature the glaze. The glaze has a satin or semi-gloss finish and this is defined as one having a gloss of from 9 to 55 units at 45° as hereinafter defined.

The particular method employed for the manufacture of the glazing composition to be applied to the ceramic article is that employing a semi-fritting technique. In this technique a composition is prepared by mixing together a source of crystalline silica in an amount less than that desired in the final glazing compositions, titanium dioxide, a source of an alkali metal, alumina and a source of strontium, calcium or magnesium. The mixture is then heated at an elevated temperature to prepare a homogeneous glass. This glass is cooled rapidly to produce a frit which is then milled and mixed with crystalline silica in an amount such that the final composition contains the desired amount of silica. At this stage water is added to the composition to produce a slip composition of the desired consistency. This glazing composition is then applied to the ceramic article.

The frit, prior to mixing with the further supply of crystalline silica, will usually contain silica ($SiO_2$) in an amount of from 25 to 55 mole %, titanium dioxide ($TiO_2$) in an amount of from 7 to 20 mole %, alkali metal ($M_2O$) in an amount of from 10 to 25 mole %, and strontium, calcium or magnesium (as oxide) in an amount of from 5 to 15 mole %. Desirably the frit also contains boron oxide ($B_2O_3$) in an amount of from 3 to 10 mole %. Alumina ($Al_2O_3$) is usually present in an amount of from 5 to 15 mole %.

The composition used to prepare the frit is obtained by mixing the desired ingredients in the desired proportions. One or more sources of alkali metal may be used and typical sources are sodium salts or potassium salts such as sodium nitrate, sodium carbonate, potassium nitrate or potassium carbonate. The alumina is usually added as hydrated aluminum oxide. The source of strontium, calcium or magnesium can be any suitable source such as an inorganic salt and typical salts are the nitrates or carbonates. Boron will usually be added to the mixture in the form of hydrated borax.

The silica that is used to prepare the frit and as the further additive is any suitable crystalline source of silica such as quartz or flint. The silica will usually have been previously ground by a wet milling process prior to mixing with other ingredients.

The titanium dioxide that is mixed with the silica and other ingredients can be any form of titanium dioxide such as pigmentary titanium dioxide but it is preferable to use granular titanium dioxide which has a size substantially greater than the pigmentary form. Typically the granular titanium dioxide has a size within the range 10 microns to 850 microns. The rutile or anatase forms of titanium dioxide may be employed and usually it is preferred to use a source of titanium dioxide containing at least 95% by weight $TiO_2$.

After mixing the composition to be used to manufacture the frit the composition is heated in a furnace at a temperature of up to about 1400° C and usually no less than 1150° C until a homogeneous glass is formed. The nature of the glass can be tested by withdrawing threads of glass from the melt at intervals and examining them visually by a microscope to see whether the product is homogeneous or not. Usually the time necessary for heating to produce the homogeneous glass will be from 30 minutes to 2 hours but this depends on the particular temperature at which the composition is heated and on the composition itself.

When the homogeneous glass has been formed the mixture is removed from the source of heat and cooled rapidly. This may be effected by quenching the mixture with water or air to form a friable material known as a frit.

The frit so obtained is then ground, in the wet or dry state, until the desired final particle size is obtained. The length of time required to mill the frit will depend on the efficiency of the grinding apparatus and on the desired particle size required. To the ground frit there is then added the further quantity of crystalline silica together with water and this is milled for a further period until a glazing composition of the required consistency is obtained. As is well known the particle size of the frit of the glazing composition must not be too small otherwise the final glazed ceramic article produced may have tears or other imperfections in the glaze.

Usually the amount of further additional silica added at this stage is such that the silica content of the final glazing composition is increased by 5 to 28 weight % relative to the silica content of the frit. Often it is desired to add to the glazing composition with the additional silica a quantity of clay in an amount of from 2.5 to 7.5 weight % on the solids content of the glazing composition.

The glazing composition so obtained has a creamy consistency which may be modified prior to application to a ceramic article according to which method is to be used for the application of the glaze. The glaze may be applied to the article by spraying or dipping and usually when the article is to be dipped into the glazing composition this will be thinned by addition of a further amount of water. One or more coats of the glazing composition may be applied to the ceramic article prior to firing if desired.

After application to the ceramic article the glaze is fired or heat matured by heating at a temperature of from 950° to 1200° C for a time of from 30 minutes to 6 hours to produce the desired glazed product. The firing of the glazed article involves heating the article slowly to the desired firing temperature followed by slow cooling after heating for the appropriate time to mature the glaze.

Any type of ceramic article may be treated with the glazing composition in accordance with the present invention, typical articles being ceramic tiles, ceramic tableware and other decorative or useful products.

The glazed article has a satin or semi-glaze finish. In fact the gloss has a value of from 9 to 55 units when measured at an angle of 45° as hereinafter defined. Within the limits of the invention a range of glosses can be obtained from a given composition by varying the ratio of silica in the base frit to the silica added during milling. The highest gloss is obtained when the ratio of fritted/mill addition silica is a maximum; conversely the lowest gloss is obtained when the ratio of fritted/mill addition silica is at a minimum. Also within the limits of the invention, the progressive addition of silica as a mill addition to a base frit of constant composition produces a progressive increase in the gloss of the fired glaze, thereby giving a further means of gloss adjustment.

The present invention employs a composition for the manufacture of a frit which can be easily smelted. The method produces a glazed article of predictable gloss and the article has good whiteness and opacity when no colouring ingredients are added to the glaze. The finished article is free of lead and accordingly there is no danger from the release of lead from the glazed article when used as tableware.

The glazed article obtained in accordance with the present invention has a gloss of from 9 to 55 units at 45° when measured by illuminating the article with a beam of light which strikes the glazed surface of the article at an angle of 45° to the horizontal and measuring the amount of reflected light by a gloss meter mounted to collect reflected light at an angle of 90° from the incident light. The gloss value is given as a comparative value with the reading obtained when using a black vitrolite sheet as a standard which is defined for the purpose of this invention as having a gloss value when measured under these conditions of 99 units. If desired any type of gloss meter can be employed providing it is calibrated initially using the black vitrolite sheet. In carrying out the determination the gloss surface to be tested is mounted horizontally.

The invention is illustrated in the following Examples.

EXAMPLE I

A base composition A was prepared from the following ingredients:

| | Parts by weight |
|---|---|
| Granular anatase titanium dioxide | 10.05 |
| Water ground quartz | 22.15 |
| Hydrated borax | 11.55 |
| Sodium nitrate | 7.45 |
| Sodium carbonate | 6.08 |
| Potassium nitrate | 14.95 |

-continued

| | Parts by weight |
|---|---|
| Aluminium hydroxide | 18.16 |
| Magnesium carbonate | 9.58 |
| Total: | 99.97 |

800 grams of the base composition A were prepared by mixing for 20 minutes the required ingredients in an end-runner mill. The mixture was then transferred to a crucible furnace which had been preheated to 1250° C and the mixture was heated at that temperature until a homogeneous glass was formed. This was tested by withdrawing at intervals of time fine threads of the mixture from the melt and examining the solidified threads.

The melt A so obtained was then quenched with cold water to produce a base frit A which was dried in an oven at a temperature of 100° C.

The base frit A had the following composition:

| | wt % | Mole % |
|---|---|---|
| $SiO_2$ | 32.60 | 37.20 |
| $TiO_2$ | 14.80 | 12.71 |
| $Na_2O$ | 12.00 | 13.27 |
| $K_2O$ | 10.22 | 7.44 |
| $B_2O_3$ | 6.21 | 6.11 |
| $Al_2O_3$ | 17.50 | 11.80 |
| MgO | 6.74 | 11.47 |
| Total: | 100.07 | 100.00 |

The base frit A so obtained was then milled for 16 hours in the ball mill provided with ceramic balls and the powdered base frit A so obtained was sieved to remove unmilled particles. To the milled powdered base frit A there was then added 42.9 parts of water ground quartz and 7.15 parts by weight of pipe clay per 100 parts of milled frit A. Water was added and the glazing composition A so obtained milled for a further period of 2 hours in the ball mill. The amount of water added was sufficient to produce a slip A or the glazing composition A of creamy consistency.

The slip A produced was sieved through the sieve having a mesh number of 100 according to British Standard Specification No. 410 (1943) and the glazing composition A stored until required for use.

A quantity of the glazing composition A was diluted with water to 50% total solids content and into the composition were dipped a number of ceramic unglazed tiles having a size of approximately 110 × 55 × 4 mm. The unglazed tiles were relatively porous and single dipping was sufficient to provide an adequate coating of the glazing composition A. The treated tiles were dried gently overnight at a temperature of about 40° C, and then loaded into a cold electric muffle furnace. The temperature of the tiles was raised through a period of from 3 to 4 hours to the maturing temperature of 960° C and held at this temperature for 3 hours. The furnace was switched off and the tiles allowed to cool in the furnace for 16 hours.

Other coated tiles were heat treated under a similar procedure at temperatures of 1000° C and 1050° C.

For the purpose of comparison a control composition was prepared according to the following formula:

| | Parts by weight |
|---|---|
| Granular titanium dioxide | 7.57 |
| Water ground quartz | 38.60 |
| Hydrated borax | 8.67 |

-continued

| | Parts by weight |
|---|---|
| Sodium nitrate | 13.00 |
| Potassium nitrate | 11.30 |
| Aluminium hydroxide | 13.72 |
| Magnesium carbonate | 7.23 |
| Total: | 100.09 |

The ingredients were mixed and heated to produce a control frit by the method described for the manufacture of base frit A. A control glazing composition was prepared in a similar manner to that described for composition A except that to 100 parts by weight of the frit was added 5.0 parts by weight of pipe clay without any further water ground quartz. Water was added as previously described. Glazed tiles were then prepared.

Both the glazing composition A and control composition have the following composition; glaze A differing from the control only in the mode of incorporation of part of the silica.

| | wt % | Mole % |
|---|---|---|
| $SiO_2$ | 52.85 | 58.20 |
| $TiO_2$ | 9.93 | 8.22 |
| $Na_2O$ | 8.05 | 8.57 |
| $K_2O$ | 6.86 | 4.81 |
| $B_2O_3$ | 4.17 | 3.96 |
| $Al_2O_3$ | 13.63 | 8.83 |
| MgO | 4.53 | 7.43 |
| Total: | 100.02 | 100.02 |

Both the types of tiles were tested to determine their colour, gloss and % brightness as follows:

Color

The color of the glaze on the tiles to be tested was measured using a Harrison Colorimeter with the results being expressed as color index.

The color index (C.I.) is given by the expression:

The colour index (C.I.) is given by the expression:

$$C.I. = 100 \times \frac{(\% \text{ reflectance in red light} - \% \text{ reflectance in blue light})}{\% \text{ reflectance in green light}}$$

Gloss was measured as described previously, but in this case an additional reading at an angle of incidence of 20° to the vertical plane was also obtained with the reflectance measured at 20° to the vertical. For this angle of 20° to the vertical a similar calibration standard was used except that the black vitrolite sheet was assumed to have a gloss value of 84 units rather than 99 units.

"% brightness" is the % reflectance in green light relative to a primary standard of pressed magnesium oxide, the green light reflectance of which is assumed to be 100. The results of the tests are shown in the following Table I.

TABLE I

| Glazing Composition | Firing Temperature °C | Colour Index | % Brightness | Gloss 45° | Gloss 20° |
|---|---|---|---|---|---|
| A | 960 | +4.5 | 85.5 | 30.0 | 17.0 |
| A | 1000 | +3.6 | 85.5 | 35.0 | 20.5 |
| A | 1050 | +4.2 | 84.5 | 34.0 | 19.0 |
| Control | 960 | +1.6 | 88.1 | 90.0 | 55.5 |
| " | 1000 | +2.5 | 86.2 | 99.0 | 62.0 |
| " | 1050 | +4.9 | 82.9 | >100 | 82.0 |

The results quite clearly show that the color stability and gloss stability were excellent over the heating range examined and that the products had a semi-gloss finish.

EXAMPLE II

Three base compositions, B, C, and D, were prepared from the following ingredients:

| | Parts by weight | | |
|---|---|---|---|
| | B | C | D |
| Granular anatase $TiO_2$ | 8.44 | 9.20 | 10.05 |
| Water ground quartz | 34.90 | 29.15 | 22.15 |
| Hydrated Borax | 9.70 | 10.57 | 11.55 |
| Sodium nitrate | 6.03 | 6.00 | 7.45 |
| Sodium carbonate | 5.23 | 6.08 | 6.08 |
| Potassium nitrate | 12.52 | 13.70 | 14.95 |
| Aluminium hydroxide | 15.25 | 16.62 | 18.16 |
| Magnesium carbonate | 8.03 | 8.77 | 9.58 |
| Total: | 100.10 | 100.09 | 99.97 |

Each base composition was prepared in a manner similar to that described for composition A and heated at 1250° C to produce base frits B, C and D of the following compositions:

| | B | | C | | D | |
|---|---|---|---|---|---|---|
| | wt. % | Mole % | wt. % | Mole % | wt. % | Mole % |
| $SiO_2$ | 47.60 | 52.8 | 41.00 | 46.05 | 32.60 | 37.20 |
| $TiO_2$ | 11.50 | 9.56 | 12.92 | 10.92 | 14.80 | 12.71 |
| $Na_2O$ | 9.34 | 10.00 | 10.50 | 11.42 | 12.00 | 13.27 |
| $K_2O$ | 7.95 | 5.60 | 8.95 | 6.40 | 10.22 | 7.44 |
| $B_2O_3$ | 4.84 | 4.62 | 5.44 | 5.26 | 6.21 | 6.11 |
| $Al_2O_3$ | 13.60 | 8.87 | 15.30 | 10.12 | 17.50 | 11.80 |
| MgO | 5.24 | 8.64 | 5.90 | 9.87 | 6.74 | 11.47 |
| Total: | 100.07 | 100.09 | 100.01 | 100.04 | 100.07 | 100.00 |

The base frits B, C and D obtained on cooling were formed into glazing compositions B, C, and D in a manner similar to that described in Example I except that for compositions B and C there was added to the respective frits 11.1 parts by weight of water ground quartz and 5.55 parts by weight of pipe clay per 100 parts by weight of frit B and 25 parts by weight of water ground quartz together with 6.25 parts by weight of pipe clay to 100 parts by weight of frit C. Glazing composition D was prepared in a manner similar to glazing composition A. The glazing compositions B, C, and D are identical in composition to the glazing composition used as control in Example I and differing only with mode of addition of $SiO_2$. Ceramic unglazed tiles were treated with the glazing compositions B, C, and D and the tiles fired at 960° C in a manner similar to that described in Example I.

Tiles glazed with a control composition prepared as described in Example I were also fired at 960° C.

The properties of the glazed tiles were measured and the results are shown in Table II.

TABLE II

| Glazing Composition | Colour Index | % Brightness | Gloss 45° | 20° |
|---|---|---|---|---|
| B | +8.9 | 87.0 | 51.5 | 36.0 |
| C | +6.9 | 87.9 | 35.0 | 20.0 |
| D | +3.2 | 86.2 | 33.5 | 15.0 |
| Control | +4.2 | 87.1 | >100 | 78.0 |

These results show that the progressive removal of crystalline silica from the base frit and its replacement by an equivalent quantity of mill addition silica produces a progressive reduction in the gloss.

EXAMPLE III

Unglazed earthenware cups and saucers were treated with glazing composition A prepared as described in Example I. In this case, however, since the unglazed earthenware was much less porous than the ceramic tiles previously used, it was necessary to adjust the solids content of the glazing composition to 65% prior to use as compared with 50% when this is to be used to treat tiles.

The treated earthenware was fired by the procedure described in Example I at 1000° C.

After cooling the earthenware was found to have a smooth semi-gloss finish. The glaze was observed to cover the surface even on sharp edges without tearing or peeling.

EXAMPLE IV

Three base compositions, E, F and G were prepared from the following ingredients:

| | Parts by weight | | |
|---|---|---|---|
| | E | F | G |
| Granulated anatase $TiO_2$ | 10.05 | 10.84 | 9.45 |
| Water ground quartz | 22.15 | 16.55 | 27.20 |
| Hydrated borax | 11.55 | 12.41 | 10.87 |
| Sodium nitrate | 7.45 | 7.22 | 5.78 |
| Sodium carbonate | 6.08 | 7.05 | 6.46 |
| Potassium nitrate | 14.95 | 16.10 | 14.10 |
| Aluminium hydroxide | 18.16 | 19.60 | 17.10 |
| Magnesium carbonate | 9.58 | 10.30 | 9.03 |
| Total: | 99.97 | 100.07 | 99.99 |

Each base composition was prepared in a manner similar to that for composition A in Example I and heated to 1250° C to produce base frits E, F and G of the following compositions:

| | E | | F | | G | |
|---|---|---|---|---|---|---|
| | wt. % | Mole % | wt. % | Mole % | wt. % | Mole % |
| $SiO_2$ | 32.60 | 37.20 | 25.10 | 29.20 | 38.75 | 43.65 |
| $TiO_2$ | 14.80 | 12.71 | 16.43 | 14.35 | 13.45 | 11.40 |
| $Na_2O$ | 12.00 | 13.27 | 13.32 | 15.00 | 10.90 | 11.92 |
| $K_2O$ | 10.22 | 7.44 | 11.37 | 8.40 | 9.30 | 6.70 |
| $B_2O_3$ | 6.21 | 6.11 | 6.90 | 6.90 | 5.65 | 5.50 |
| $Al_2O_3$ | 17.50 | 11.80 | 19.42 | 13.30 | 15.90 | 10.57 |
| MgO | 6.74 | 11.47 | 7.48 | 12.92 | 6.13 | 10.30 |
| Total: | 100.07 | 100.00 | 100.02 | 100.07 | 100.08 | 100.04 |

Glazing compositions E, F and G were prepared in a manner similar to that described for glazing composition A in Example I except that for compositions F and G there was added to 100 parts by weight of the base frits respectively 58.8 parts by weight of water-ground quartz and 7.90 parts by weight of pipe clay, and 29.9 parts by weight of water ground quartz and 6.50 parts by weight pipe clay. Composition E was prepared as composition A.

Glazing compositions E, F and G have identical compositions to glaze A and control of Example I.

Glazed tiles were prepared as described in Example I and fired respectively at temperatures of 960° and 1050° C.

The physical properties of the glazed tiles were measured and the results obtained are shown below in Table IV.

TABLE IV

| Glazing Composition | Firing Temperature ° C | Colour Index | % Brightness | Gloss 45° | 20° |
|---|---|---|---|---|---|
| E | 960 | +2.5 | 85.4 | 27.0 | 18.0 |
| F | 960 | +5.2 | 84.4 | 9.0 | 4.0 |
| G | 960 | +2.0 | 85.7 | 30.0 | 21.0 |
| E | 1050 | +3.8 | 83.9 | 35.0 | 20.0 |
| F | 1050 | +7.6 | 81.9 | 15.0 | 6.5 |
| G | 1050 | +4.4 | 83.5 | 40.5 | 25.5 |

EXAMPLE V

To separate batches of 100 parts by weight of base frit A, the composition and preparation technique for which is detailed in Example I, was added respectively 32.0 parts $SiO_2$ + 6.6 parts clay, 42.9 parts $SiO_2$ + 7.15 parts clay and 56.7 parts $SiO_2$ + 7.8 parts clay. Milling was carried out in the manner previously described to give glaze compositions H, I, and J having the following compositions (composition I was identical in all respects to glaze composition A, given in Example I):

|  | H | | I | | J | |
|---|---|---|---|---|---|---|
|  | wt. % | Mole % | wt. % | Mole % | wt. % | Mole % |
| $SiO_2$ | 49.15 | 54.50 | 52.85 | 58.20 | 56.75 | 62.05 |
| $TiO_2$ | 10.75 | 8.96 | 9.93 | 8.22 | 9.05 | 7.43 |
| $Na_2O$ | 8.72 | 9.35 | 8.05 | 8.57 | 7.35 | 7.77 |
| $K_2O$ | 7.43 | 5.25 | 6.86 | 4.81 | 6.25 | 4.36 |
| $B_2O_3$ | 4.52 | 4.32 | 4.17 | 3.96 | 3.80 | 3.58 |
| $Al_2O_3$ | 14.60 | 9.54 | 13.63 | 8.83 | 12.62 | 8.14 |
| MgO | 4.89 | 8.07 | 4.53 | 7.43 | 4.12 | 6.72 |
| Total: | 100.06 | 99.99 | 100.02 | 100.02 | 99.94 | 100.05 |

Glazes were prepared as described in Example I and fired respectively at 960° and 1050° C.

Physical properties of the glazed tiles are shown in Table V below.

TABLE V

| Glazing Composition | Firing Temperature ° C | Colour Index | % Brightness | Gloss 45° | Gloss 20° |
|---|---|---|---|---|---|
| H | 960 | +4.1 | 85.1 | 25.5 | 13.0 |
| I | 960 | +4.6 | 84.9 | 29.0 | 15.0 |
| J | 960 | +5.0 | 84.2 | 34.5 | 20.0 |
| H | 1050 | +3.5 | 83.6 | 33.0 | 18.0 |
| I | 1050 | +4.0 | 83.6 | 34.0 | 18.5 |
| J | 1050 | +6.2 | 83.2 | 38.5 | 23.0 |

The results show that an increase in the overall $SiO_2$ content of the glaze, brought about by increasing the quantity of silica, added as a mill addition to a frit of standard composition, produces a progressive increase in gloss. (EXAMPLE VI)

| | | |
|---|---|---|
| Granular Anatase Titanium Dioxide | 10.20 | parts by weight |
| Water-ground quartz | 23.85 | parts by weight |
| Hydrated borax | 15.48 | parts by weight |
| Sodium nitrate | 6.32 | parts by weight |
| Sodium carbonate | 5.90 | parts by weight |
| Potassium nitrate | 12.20 | parts by weight |
| Aluminium hydroxide | 16.33 | parts by weight |
| Magnesium carbonate | 9.72 | parts by weight |
| | 100.00 | |

800g batch of this base composition were prepared and smelted as described in Example I to produce base frit K, having the following composition:

| | wt. % | Mole % |
|---|---|---|
| $SiO_2$ | 34.60 | 39.00 |
| $TiO_2$ | 14.80 | 12.50 |
| $Na_2O$ | 12.00 | 13.06 |
| $K_2O$ | 8.22 | 5.90 |
| $B_2O_3$ | 8.21 | 7.96 |
| $Al_2O_3$ | 15.50 | 10.30 |
| MgO | 6.74 | 11.28 |
| | 100.07 | 100.00 |

Base frit K was then dry-milled as described in Example I. The final glaze composition was then made by adding silica, pipe clay and water as follows:

| | |
|---|---|
| Base frit K | 100 parts by weight |
| Water ground quartz | 42.9 parts by weight |
| Pipe clay | 7.15 parts by weight |
| Water | 70 parts by weight |

Wet milling, and application to unglazed biscuit tiles was then carried out as described in Example I. Firing at 960° C and 1050° C was carried out as described in Example I, giving a fired glaze of the following composition:

| | Wt. % | Mole % |
|---|---|---|
| $SiO_2$ | 54.20 | 59.00 |
| $TiO_2$ | 9.93 | 8.12 |
| $Na_2O$ | 8.04 | 8.47 |
| $K_2O$ | 5.51 | 3.82 |
| $B_2O_3$ | 5.50 | 5.16 |
| $Al_2O_3$ | 12.29 | 7.88 |
| MgO | 4.52 | 7.48 |
| | 99.99 | 99.93 |

The glazed tiles were tested to determine color and gloss as described in Example I.

TABLE VI

| Glazing Composition | Firing Temperature ° C | Colour Index | % Brightness | Gloss 45° | Gloss 20° |
|---|---|---|---|---|---|
| K | 960 | +6.8 | 83.5 | 26.0 | 13.0 |
| K | 1050 | +8.1 | 81.4 | 35.5 | 23.0 |

Thus, it is shown that Composition K gives fired glazes of a similar semi-gloss texture to those listed in previous Examples. It has a slightly creamier color than previously tested Examples but beter smoothness, particularly when fired at 1050° C.

What is claimed is:

1. A substantially lead-free glazing composition capable of forming a glaze with a gloss of from 9–55 units measured at 45°, on ceramic articles when fired at a temperature of 950°–1200° C., comprising a finely—divided frit, an unfritted crystalline silica, water and optionally a clay, in which said frit comprises as essential ingredients silica ($SiO_2$) in an amount of from 25 to 55 mole percent, titanium dioxide ($TiO_2$) in an amount of from 7 to 20 mole percent, alkali metal oxides ($M_2O$) in an amount of from 10 to 25 mole percent, and strontium, calcium or magnesium (as oxide) in an amount of from 5 to 15 mole percent, alumina ($Al_2O_3$) in an amount of from 5 to 15 mole percent, and boron ($B_2O_3$) in an amount of from 0 to 10 mole percent, the amount of said unfritted crystalline silica being such that the silica content of the final glazing composition is increased from 5 to 28 weight percent ($SiO_2$) relative to the silica content of the frit.

2. A glazing composition according to claim 1 in which said frit contains boron oxide ($B_2O_3$) in an amount of from 3 to 10 mole percent.

3. A glazing composition according to claim 1 in which clay is included and the amount of clay as from 2.5 to 7.5 weight percent based on the solids content of the glazing composition.

4. A glazing composition according to claim 1 in which said unfritted crystalline silica is selected from the group consisting of quartz and flint.

5. A method for the production of a glazing composition comprising mixing together silica ($SiO_2$) in an amount of from 25 to 55 mole percent, titanium dioxide ($TiO_2$) in an amount of from 7 to 20 mole percent, alumina ($Al_2O_3$) in an amount of from 5 to 15 mole percent, alkali metal oxide ($M_2O$) in an amount of from 10 to 25 mole percent, boron ($B_2O_3$) in an amount of from 0 to 10 mole percent, and strontium, calcium or magnesium (as oxide) in an amount of from 5 to 15 mole percent, heating the mixture so obtained until a homogeneous glass is formed, cooling the heated mixture rapidly to form a frit, grinding the frit and adding to the frit, water and a further amount of unfritted, crystalline silica to provide a glazing composition capable of forming a glaze with a gloss of from 9–55 units, measured at 45°, on ceramic articles when fired at a temperature of 950°–1200° C, the amount of said unfritted crystalline silica being such that the silica content of the glazing composition is increased from 5 to 28 weight percent relative to the silica content of the frit.

6. A method according to claim 5 in which the source of alkali metal is a sodium salt.

7. A method according to claim 5 in which the source of alkali metal is a potassium salt.

8. A method according to claim 5 in which the alumina is mixed with the other ingredients in the form of hydrated aluminum oxide.

9. A method according to claim 5 in which the source of strontium, calcium or magnesium is an inorganic salt.

10. A method according to claim 5 in which a source of boron ($B_2O_3$) is mixed with the titanium dioxide, silica, alumina and other ingredients in an amount of from 3 to 10 mole percent.

11. A method according to claim 10 in which the boron is added in the form of hydrated borax.

12. A method according to claim 5 in which the silica is added as quartz.

13. A method according to claim 5 in which the silica is added as flint.

14. A method according to claim 5 in which the titanium dioxide is pigmentary titanium dioxide.

15. A method according to claim 5 in which the titanium dioxide is granular titanium dioxide having a particle size within the range 10 microns to 850 microns.

16. A method according to claim 5 in which the source of titanium dioxide contains at least 95 percent by weight $TiO_2$.

17. a method according to claim 5 in which the mixture is heated at a temperature of up to 1400° C until a homogeneous glass is formed.

18. A method according to claim 17 in which the mixture is heated at a temperature of not less than 1150° C.

19. A method according to claim 16 in which the mixture is heated for a time of from 30 minutes to 2 hours.

20. A method according to claim 5 in which the heated mixture is cooled rapidly by quenching with water.

21. A method according to claim 5 in which the heated mixture is cooled rapidly in air.

* * * * *